United States Patent
Fetzer et al.

(10) Patent No.: US 11,035,831 B1
(45) Date of Patent: Jun. 15, 2021

(54) APPARATUS AND METHOD FOR NON-DESTRUCTIVE INSPECTION OF VARIABLE ANGLE MANUFACTURING COMPONENTS

(71) Applicant: The Boeing Company, Chicago, IL (US)

(72) Inventors: Barry A. Fetzer, Renton, WA (US); Kareem Shehab, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/708,084

(22) Filed: Dec. 9, 2019

(51) Int. Cl.
*B25J 9/00* (2006.01)
*G01N 29/265* (2006.01)

(52) U.S. Cl.
CPC .......... *G01N 29/265* (2013.01); *B25J 9/0009* (2013.01); *G01N 2291/0289* (2013.01)

(58) Field of Classification Search
CPC ........... G01N 29/265; G01N 2291/0289; B25J 9/0009
USPC ......................................................... 73/618
See application file for complete search history.

(56) References Cited

U.S. PATENT DOCUMENTS

| 9,127,971 | B2 * | 9/2015 | Sarr ...................... G01N 29/265 |
| 9,746,447 | B2 | 8/2017 | Fetzer et al. |
| 9,950,813 | B2 * | 4/2018 | Hafenrichter ........ G01N 29/225 |
| 10,184,916 | B2 | 1/2019 | Sarr et al. |
| 2007/0039390 | A1 * | 2/2007 | Duncan ................ G01N 29/265 73/606 |
| 2014/0305217 | A1 | 10/2014 | Tapia et al. |
| 2015/0226369 | A1 * | 8/2015 | Troy ....................... B66C 13/48 180/2.1 |
| 2016/0123934 | A1 | 5/2016 | Fetzer et al. |
| 2017/0284973 | A1 * | 10/2017 | Falter .................... G01N 29/24 |

(Continued)

FOREIGN PATENT DOCUMENTS

| EP | 3021113 A1 | 5/2016 |
| WO | 0218958 A2 | 3/2002 |

OTHER PUBLICATIONS

IEEE Instrumentation & Measurement Magazine, Robotic Assistants for airline inspectors, Mel Siegel et al., Mar. 1998 (Year: 1998).*

(Continued)

*Primary Examiner* — Jacques M Saint Surin
(74) *Attorney, Agent, or Firm* — Kunzler Bean & Adamson

(57) ABSTRACT

Disclosed herein is a non-destructive inspection apparatus that utilizes a biased probe housing to maintain ultrasonic coupling with a part. The apparatus includes an attachment body attached to a robotic arm that has a tool center point (TCP). The apparatus also includes a probe assembly coupled to the attachment body such that movement of the TCP results in a corresponding movement of the probe assembly, and a probe housing disposed around the probe assembly and moveably coupled to the attachment body. The apparatus also includes a biasing member disposed between the attachment body and the probe housing that urges the probe housing away from the attachment body. Also disclosed is a method that includes positioning a probe housing and a probe assembly adjacent a part, ultrasonically scanning the part for defects, and biasing the probe housing relative to the attachment body to maintain engagement of the part.

20 Claims, 10 Drawing Sheets

(56) References Cited

U.S. PATENT DOCUMENTS

2018/0238834 A1    8/2018  Sekiguchi
2020/0003734 A1*   1/2020  Troy .................. G01N 29/4454

OTHER PUBLICATIONS

Automation in Constructionjournal homepage: www.elsevier.com/locate/autcon, Past, present and future of robotic tunnel inspection, Momtero et al. (Year: 2015).*
EP Extended Search Report concerning EP Patent Application No. 20206927.4 dated Apr. 13, 2021.

* cited by examiner

APPARATUS AND METHOD FOR NON-DESTRUCTIVE INSPECTION OF VARIABLE ANGLE MANUFACTURING COMPONENTS

FIELD

This disclosure relates generally to non-destructive inspection, and more particularly to non-destructive inspection of components of those vehicles and machinery.

BACKGROUND

Various manufacturing components, such as vehicle parts, may be utilized during a manufacturing process. Such manufacturing components may be composite structures formed from composite materials. The formation of these composite structures may inadvertently include defects. Accordingly, the manufacturing components are scanned to assess a quality of the component to identify defects. One scanning technique that is useful for identifying defects uses ultrasonic energy to generate a representation or image of the interior of the component. The generated representation is used to identify defects such as cracks and voids. Generally, a robot arm moves a scanning probe along a surface of the component. If the surface of the component has a variable curvature, the robot arm moves to accommodate the changing curvature while motors and sensors adjust a sensor array. However, often it is difficult or time consuming to accommodate the changing curvature. Further, often it is difficult for the robot to maintain a water couple of the scanning probe with the surface of the component.

SUMMARY

The subject matter of the present application provides example non-destructive inspection devices that overcome the above-discussed shortcomings of prior art techniques. The subject matter of the present application has been developed in response to the present state of the art, and in particular, in response to shortcomings of current non-destructive inspection devices.

Disclosed herein is a non-destructive inspection (NDI) apparatus that includes an attachment body configured to attach to a robotic arm, where the robotic arm defines a tool center point (TCP). The apparatus also includes an ultrasonic probe assembly fixedly coupled to the attachment body such that movement of the TCP by the robotic arm results in a corresponding movement of the ultrasonic probe assembly. The apparatus also includes a probe housing disposed around the ultrasonic probe assembly and moveably coupled to the attachment body, and a biasing member disposed between the attachment body and the probe housing, where the biasing member urges the probe housing away from the attachment body. The preceding subject matter of this paragraph characterizes example 1 of the present disclosure.

The NDI apparatus, in certain examples, includes a first housing rod slidably coupled with an opening in the probe housing, wherein the biasing member is disposed between the opening of the probe housing and the attachment body. In certain examples, the first housing rod includes a first end coupled to the attachment body, and a second end having a diameter greater than a diameter of the opening of the probe housing. The preceding subject matter of this paragraph characterizes example 2 of the present disclosure, wherein example 2 also includes the subject matter according to example 1, above.

The biasing member, in certain examples, is a compression spring positioned around the first housing rod. The preceding subject matter of this paragraph characterizes example 3 of the present disclosure, wherein example 3 also includes the subject matter according to example 2, above.

The NDI apparatus, in certain examples, includes a second housing rod slidably coupled with a second opening in the probe housing, wherein a second biasing member is disposed between the second opening of the probe housing and the attachment body. In certain examples, the second housing rod includes a first end coupled to the attachment body, and a second end having a diameter greater than a diameter of the second opening of the probe housing. The preceding subject matter of this paragraph characterizes example 4 of the present disclosure, wherein example 4 also includes the subject matter according to example 3, above.

The second biasing member, in certain examples, is a compression spring positioned around the second housing rod. The preceding subject matter of this paragraph characterizes example 5 of the present disclosure, wherein example 5 also includes the subject matter according to example 4, above.

The attachment body, in certain examples, includes an attachment plate, and an overload protection device disposed between the attachment plate and the robotic arm. The preceding subject matter of this paragraph characterizes example 6 of the present disclosure, wherein example 6 also includes the subject matter according to any one of examples 1-5, above.

The probe housing, in certain examples, includes a part engagement surface configured to engage a surface of a part and facing away from the attachment body, and an end surface facing the attachment body. The probe housing also includes a sensor cavity formed in the body and configured to receive the ultrasonic probe assembly and to allow the ultrasonic probe assembly to translationally move within the sensor cavity. The sensor cavity, in certain examples, extends entirely through the body from the end surface to the part engagement surface. The preceding subject matter of this paragraph characterizes example 7 of the present disclosure, wherein example 7 also includes the subject matter according to any one of example 1-6, above.

The sensor cavity, in certain embodiments has an entire length between the part engagement surface and the end surface of between about 1 inch and about 5 inches. The preceding subject matter of this paragraph characterizes example 8 of the present disclosure, wherein example 8 also includes the subject matter according to example 7, above.

The NDI apparatus, in certain examples, also includes a water channel formed in the body and extending from a first opening in the end surface of the body to a second opening formed in a wall of the sensor cavity, the second opening positioned adjacent an opening in the part engagement surface of the body. The preceding subject matter of this paragraph characterizes example 9 of the present disclosure, wherein example 9 also includes the subject matter according to any one of examples 7 and 8, above.

The part, in certain examples, is a wing spar having a varying radius and a varying web to flange angle. A size and a shape of the probe housing is selected according to a maximum radius of the wing spar and a minimum web to flange angle of the wing spar. The preceding subject matter of this paragraph characterizes example 10 of the present disclosure, wherein example 10 also includes the subject matter according to any one of examples 7-9, above.

The ultrasonic probe assembly, in certain examples includes an ultrasonic sensor array, and at least one sensor rod having a first end rigidly coupled to the attachment body and a second end rigidly coupled to the ultrasonic sensor array. The at least one sensor rod is configured to maintain a fixed position of the ultrasonic sensor array with reference to the attachment body. The preceding subject matter of this paragraph characterizes example 11 of the present disclosure, wherein example 11 also includes the subject matter according to any one of examples 1-10 above.

Additionally disclosed herein is a system for NDI. The system includes, in certain examples: a robotic arm; a controller configured to control movement of a tool center point (TCP) of the robotic arm; and an NDI apparatus coupled to the TCP. In certain examples, the NDI apparatus includes an attachment body configured to attach to a robotic arm, where the robotic arm defines the TCP, and an ultrasonic probe assembly fixedly coupled to the attachment body such that movement of the TCP by the robotic arm results in a corresponding movement of the ultrasonic probe assembly. The NDI apparatus also includes a probe housing disposed around the ultrasonic probe assembly and moveably coupled to the attachment body, and a biasing member disposed between the attachment body and the probe housing, where the biasing member urges the probe housing away from the attachment body. The preceding subject matter of this paragraph characterizes example 12 of the present disclosure.

The system, in certain examples, includes a first housing rod slidably coupled with an opening in the probe housing, wherein the biasing member is disposed between the opening of the probe housing and the attachment body. In certain examples, the first housing rod includes a first end coupled to the attachment body, and a second end having a diameter greater than a diameter of the opening of the probe housing. The preceding subject matter of this paragraph characterizes example 13 of the present disclosure, wherein example 13 also includes the subject matter according to example 12, above.

The biasing member, in certain examples, is a compression spring positioned around the first housing rod. The preceding subject matter of this paragraph characterizes example 14 of the present disclosure, wherein example 14 also includes the subject matter according to example 13, above.

The ultrasonic probe assembly, in certain examples includes an ultrasonic sensor array, and at least one sensor rod having a first end rigidly coupled to the attachment body and a second end rigidly coupled to the ultrasonic sensor array. The at least one sensor rod is configured to maintain a fixed position of the ultrasonic sensor array with reference to the attachment body. The preceding subject matter of this paragraph characterizes example 15 of the present disclosure, wherein example 15 also includes the subject matter according to any one of examples 12-14 above.

The probe housing, in certain examples, includes a part engagement surface configured to engage a surface of a part and facing away from the attachment body, and an end surface facing the attachment body. The probe housing also includes a sensor cavity formed in the body and configured to receive the ultrasonic probe assembly and to allow the ultrasonic probe assembly to translationally move within the sensor cavity. The sensor cavity, in certain examples, extends entirely through the body from the end surface to the part engagement surface. The preceding subject matter of this paragraph characterizes example 16 of the present disclosure, wherein example 16 also includes the subject matter according to any one of example 12-15, above.

The system, in certain examples, also includes a water channel formed in the body and extending from a first opening in the end surface of the body to a second opening formed in a wall of the sensor cavity, the second opening positioned adjacent an opening in the part engagement surface of the body. The preceding subject matter of this paragraph characterizes example 17 of the present disclosure, wherein example 17 also includes the subject matter according to example 16, above.

The controller, in certain examples, includes a laser profiler configured to measure a distance between the TCP and an inspection radius, and where the controller is further configured to move the TCP in response to the measured distance. The preceding subject matter of this paragraph characterizes example 18 of the present disclosure, wherein example 18 also includes the subject matter according to any one of examples 12-17, above.

Additionally, disclosed herein is a method of non-destructively inspecting a part. The method, in certain examples, includes positioning a probe housing and an ultrasonic probe assembly such that a part engagement surface of the probe housing engages the part, wherein the ultrasonic probe assembly is fixedly coupled to an attachment body and the probe housing is moveably coupled to the attachment body. The method also includes ultrasonically scanning the part for defects while traversing the part engagement surface across a surface of the part, adjusting a distance between the ultrasonic probe assembly and the surface of the part while traversing and scanning the part, and biasing the probe housing relative to the attachment body to maintain engagement of the part engagement surface with the surface of the part. The preceding subject matter of this paragraph characterizes example 19 of the subject disclosure.

Engaging the surface of the part, in certain examples, includes pressing the part engagement surface against the surface of the part. The preceding subject matter of this paragraph characterizes example 20 of the present disclosure, wherein example 20 also includes the subject matter according to example 19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
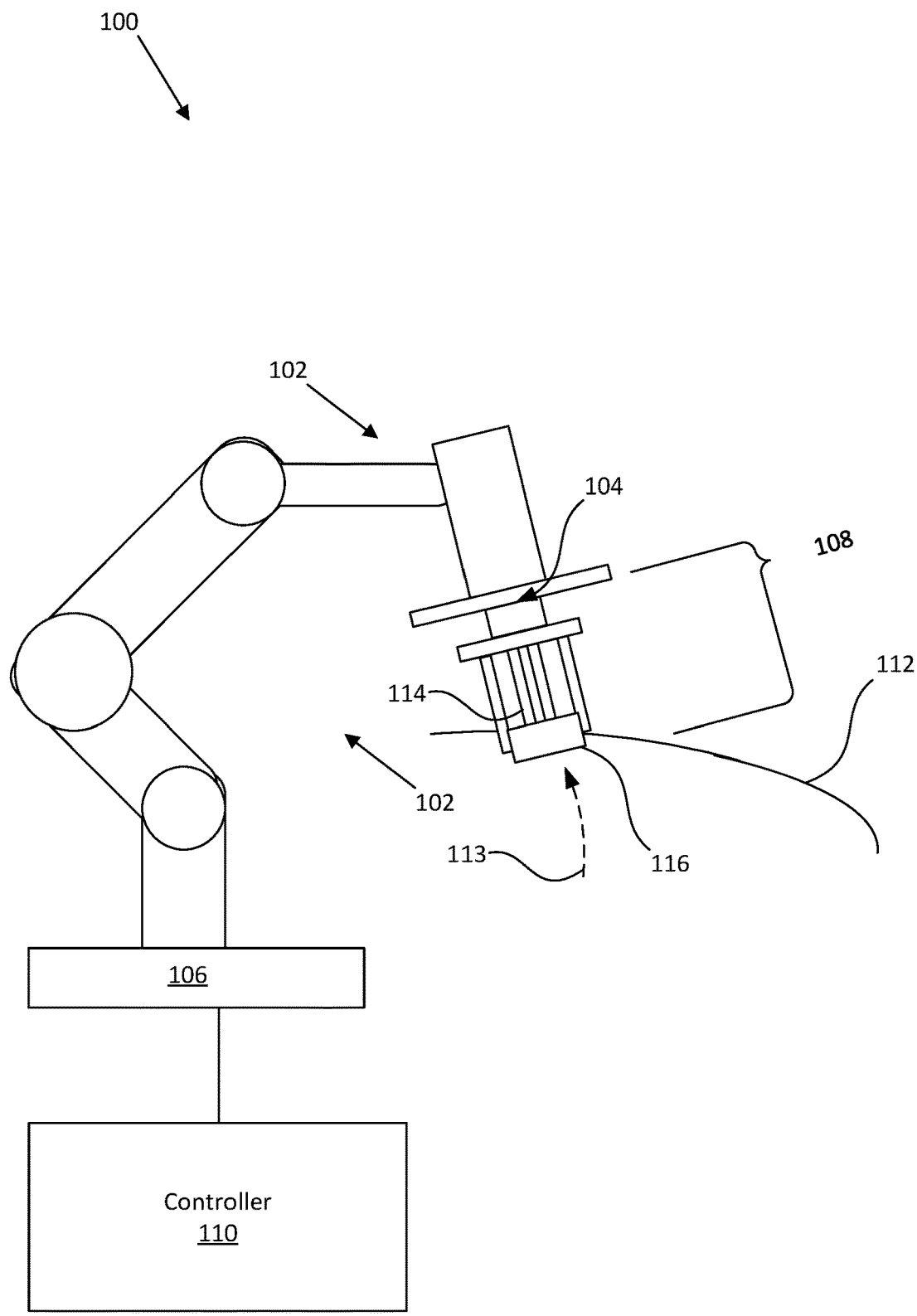
FIG. 1 is a schematic block diagram illustrating one embodiment of a system for non-destructive inspection (NDI) of a manufacturing component, according to examples of the subject disclosure.

FIG. 1 is a schematic block diagram illustrating one embodiment of a system 100 for non-destructive inspection (NDI) of a manufacturing component 112 (also referred to herein as a part), according to examples of the subject disclosure. In certain embodiments, the system 100 is used to inspect a variety of structures including composite structures of a wide range of sizes and shapes, such as composite aircraft wings, spars, and fuselage barrels.

The system 100, in certain examples, includes a robotic arm 102. The robotic arm 102 is a jointed-arm robot that is configured to provide movement and positioning of a tool center point (TCP) 104. The TCP 104, in certain examples, is a mathematical point (positioned on an end of the robotic arm 102) that the robotic arm 102 moves through space with reference to the robotic base 106. The TCP 104, in certain examples, is located at an end of the robotic arm 102, and is configured to couple to a tool, such as a non-destructive inspection apparatus 108. For example, the end of the robotic arm 102 is a plate to which the tool, or the end effector, is attached. The TCP 104, in certain examples, is a point positioned a predetermined distance from the end of the robotic arm that corresponds with a location of an ultrasonic sensor array attached to the robotic arm. For example, the TCP 104 may identify a location of a focal point of a curved ultrasonic sensor array (see FIG. 3) that is offset from the end of the robotic arm 102. A controller 110 controls the movement and positioning of the TCP 104.

The controller 110, in certain examples, is implemented using software, hardware, firmware, or a combination thereof. When software is used, the operations performed by the controller 110 are implemented using, for example, program code configured to run on a processor unit. When firmware is used, the operations are implemented using, for example, program code and data stored in persistent memory to run on a processor unit. When hardware is used, the hardware includes one or more circuits that operate to perform the operation of moving the TCP 104. The hardware, in certain embodiments, takes the form of a circuit system, an integrated circuit, an application specific integrated circuit (ASIC), a programmable logic device, etc.

The controller 110, in certain embodiments, is configured to control the movement of the robotic arm 102 which is capable of movement with up to six degrees of freedom or more. The robotic arm 102 is, in certain examples, is configured to couple with the end effector (e.g., the NDI apparatus 108). The end effector, in one example, is integrated as part of the robotic arm 102 or alternatively, is removably coupled to the TCP 104. Inspection of the manufacturing component 112, in certain examples, uses an ultrasonic probe assembly 114 (see FIG. 3) having ultrasonic sensors. The structure of the manufacturing component 112 is scanned by the NDI apparatus 108 to measure structural and mechanical properties to ensure the manufacturing component 112 is free of defects.

The manufacturing component 112, in certain examples, has portions with curvatures of varying radii and varying angles. For effective scanning, a probe housing 116 (see FIG. 2), that is disposed around the ultrasonic probe assembly 114, is positioned adjacent the manufacturing component 112. In certain examples, the probe housing 116 maintains contact with a surface of the manufacturing component 112. The ultrasonic probe assembly 114 is maintained at a particular distance and angle or orientation relative to a particular position of the manufacturing component 112. However, certain configurations of the manufacturing component 112, such as a sharp transition from a flange to a web of a wing spar, may not provide the clearance necessary for a traditional inspection head attached to a robotic arm 102 to traverse the transition while maintaining the proper distance between the ultrasonic probe assembly and the manufacturing component 112.

Beneficially, and as will be discussed in greater detail below, the NDI apparatus 108 is configured with the probe housing 116, which is moveable with reference to an attachment body 118 of the NDI apparatus 108. The NDI apparatus 108 provides the ability to inspect a manufacturing component 112 that has a variable radius and a variable angle. The system 100 (e.g., the NDI apparatus 108) includes position sensors that monitor changes in a radius and angle of the manufacturing component 112 and facilitate adjustment of the position of the TCP 104 relative to the manufacturing component 112. The ultrasonic probe assembly 114 is fixedly coupled to the TCP 104 (see FIG. 1) and moves together with the TCP 104. The probe housing 116, beneficially, is moveably coupled to the TCP 104 and biased away from the TCP 104 by a biasing member 120 (see FIG. 2) to maintain contact with the manufacturing component 112 even when the configuration of the manufacturing component 112 causes the robotic arm 102 to increase a distance between the ultrasonic probe assembly 114 and the manufacturing component (see FIG. 4). In certain examples, the probe housing 116 always maintains contact with the manufacturing component regardless of the position of the ultrasonic probe assembly 114 so that ultrasonic coupling is maintained (e.g., water coupling is maintained).

Figure 2:
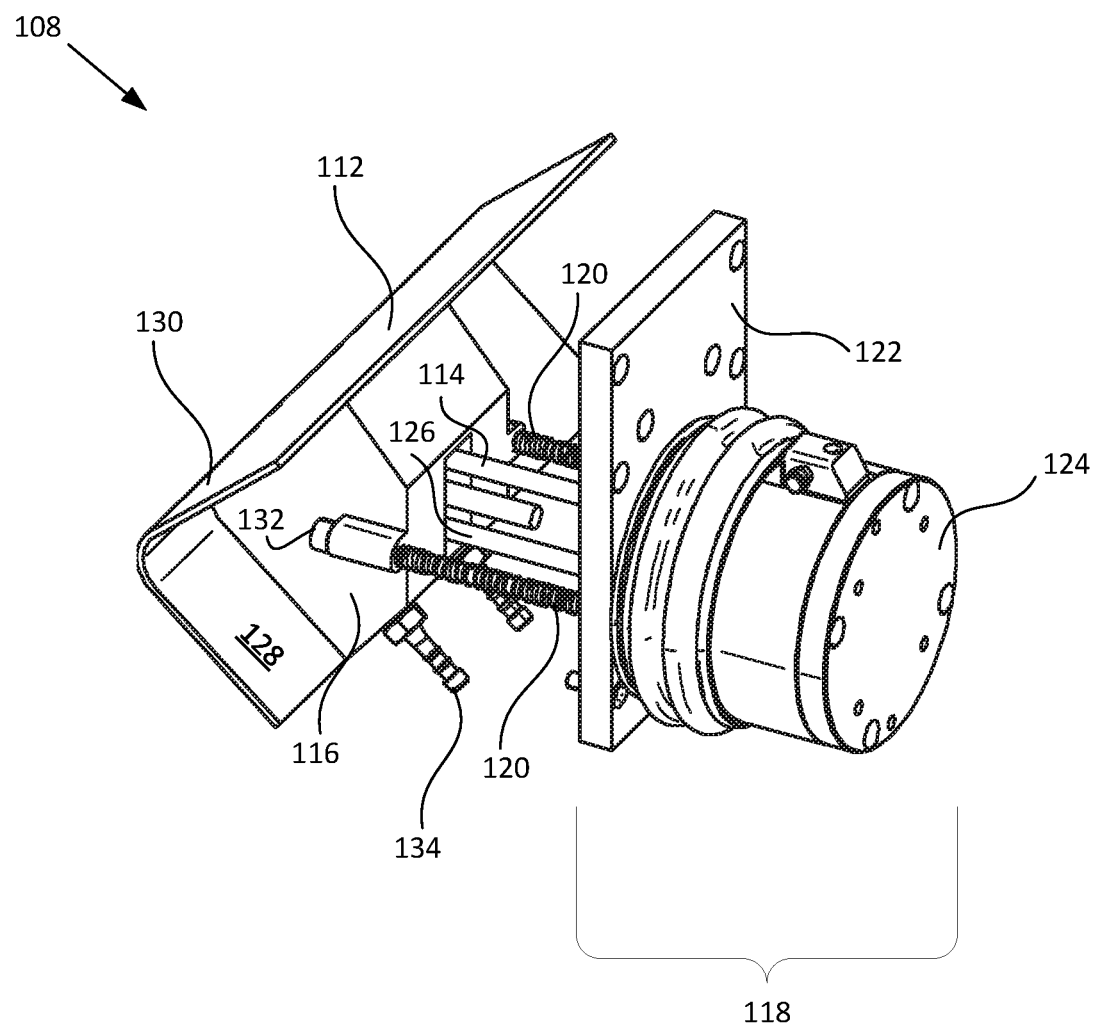
FIG. 2 is a perspective view diagram of an NDI apparatus, according to examples of the subject disclosure.

FIG. 2 is a perspective view diagram of the NDI apparatus 108, according to examples of the subject disclosure. The NDI apparatus 108, in certain examples, comprises the attachment body 118, which is configured to connect the NDI apparatus 108 to the robotic arm 102. The attachment body 118 includes an attachment plate 122 and an overload protection device 124. The attachment plate 122, in certain examples, is a generally rectangular member provided with one or more openings for mounting the ultrasonic probe assembly 114, the probe housing 116, various positioning sensors, and the overload protection device 124. The overload protection device 124 is a sensor-enabled coupling that detects a collision between the probe housing 116 and any object that was not expected by the controller 110. The overload protection device 124, in certain examples, is disposed between the attachment plate 122 and the TCP 104, or end, of the robotic arm 102.

In certain examples, the ultrasonic probe assembly 114 is fixedly coupled to, and extends outward from the attachment plate 122. One or more sensor rods 126 position the ultrasonic sensor array (see FIG. 3) a fixed distance from the attachment plate 122. The sensor rod(s) 126 maintain this distance as the robotic arm 102 moves the NDI apparatus 108 across the surface of the manufacturing component 112. In the depicted example, the NDI apparatus 108 is scanning a surface of a wing spar, and in particular, a transition between a flange 128 and a web 130 or sidewall of the wing spar. The wing spar, in certain examples, has a varying radius and a varying web to flange angle, and accordingly, the size and shape of the probe housing 116 is selected based on a maximum radius of the wing spar and a minimum web to flange angle of the wing spar. However, the NDI apparatus 108 is adaptable to scan any component of any vehicle or structure.

The probe housing 116, in certain examples, is moveably coupled with the attachment plate 122. One or more housing rods 132 are rigidly coupled to the attachment plate 122 and extend outward in a direction opposite that of the overload protection device 124. Within examples, the one or more housing rods 132 include a first housing rod and a second housing rod (see FIG. 5). The probe housing 116 has openings (see FIG. 7b) that slideably engage the housing rods 132. A biasing member 120, in certain examples, is disposed around each housing rod 132 between the probe housing 116 and the attachment plate 122. The biasing member 120 is configured to urge the probe housing 116 away from the attachment plate 122. Accordingly, the robotic arm 102 can adjust the position of the ultrasonic probe assembly 114 with respect to the manufacturing component 112 while the probe housing 116 maintains contact with the surface of the manufacturing component 112. In other words, if the curvature of the manufacturing component 112 is such that the robotic arm 102 must increase a distance between the ultrasonic probe assembly 114 and the manufacturing component 112, the biasing member 120 urges the probe housing 116 away from the attachment plate 122 to maintain contact with the manufacturing component 112.

The probe housing 116, in certain examples, is configured with one or more hose couplings 134 that are fluidly connected to water passageways in the probe housing 116. The hose couplings 134 receive a fluid, such as water, that is useful as an ultrasonic coupling medium to maintain ultrasonic coupling (i.e., "water coupling") between the sensors of the ultrasonic probe assembly 114 and the manufacturing component 112. For clarity, the various inlet tubes that supply water to the hose couplings 134 have been omitted from these figures.

Figure 3:
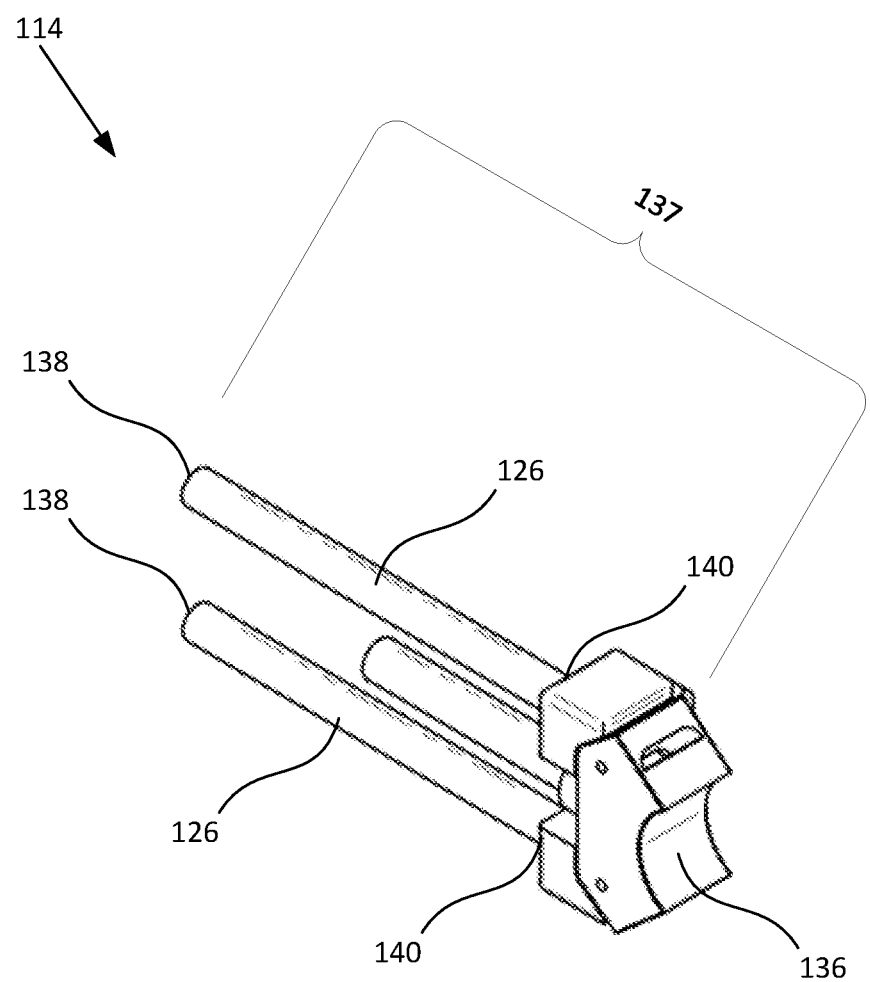
FIG. 3 is a perspective view diagram of the ultrasonic probe assembly, according to examples of the subject disclosure.

FIG. 3 is a perspective view diagram of the ultrasonic probe assembly 114, according to examples of the subject disclosure. The ultrasonic probe assembly 114, in certain examples, includes an ultrasonic sensor array 136 or transducer. The ultrasonic sensor array 136 is configured to deliver energy to and/or analyze energy received from the manufacturing component 112 that is being scanned. The ultrasonic sensor array 136, in certain examples, is configured to operate in a pulse echo mode that uses sound energy to detect and identify defects or flaws that may be present within the manufacturing component 112. The ultrasonic probe assembly 114 communicates with the controller 110 to relay sensor values determined as the ultrasonic probe assembly 114 is moved along a scanning path 113 (see FIG. 1) associated with the manufacturing component 112.

One or more sensor rods 126, in certain examples, are configured to position the ultrasonic sensor array 136 a distance 137 from the attachment plate 122. Each elongated sensor rod 126 includes a first end 138 and a second end 140. The first end 138 of the sensor rod is fixedly coupled, in certain examples, to the attachment plate 122. The second end 140, in certain examples, is fixedly coupled to the ultrasonic sensor array 136. In other examples, the second end 140 includes a flexible connection to the ultrasonic sensor array 136 to allow for small movements in translation and rotation. For example, the flexible connection is configured to allow a +/−3-degree rotation to accommodate movement of the probe housing 116 during traversal of the scanning path 113.

Figure 4A:
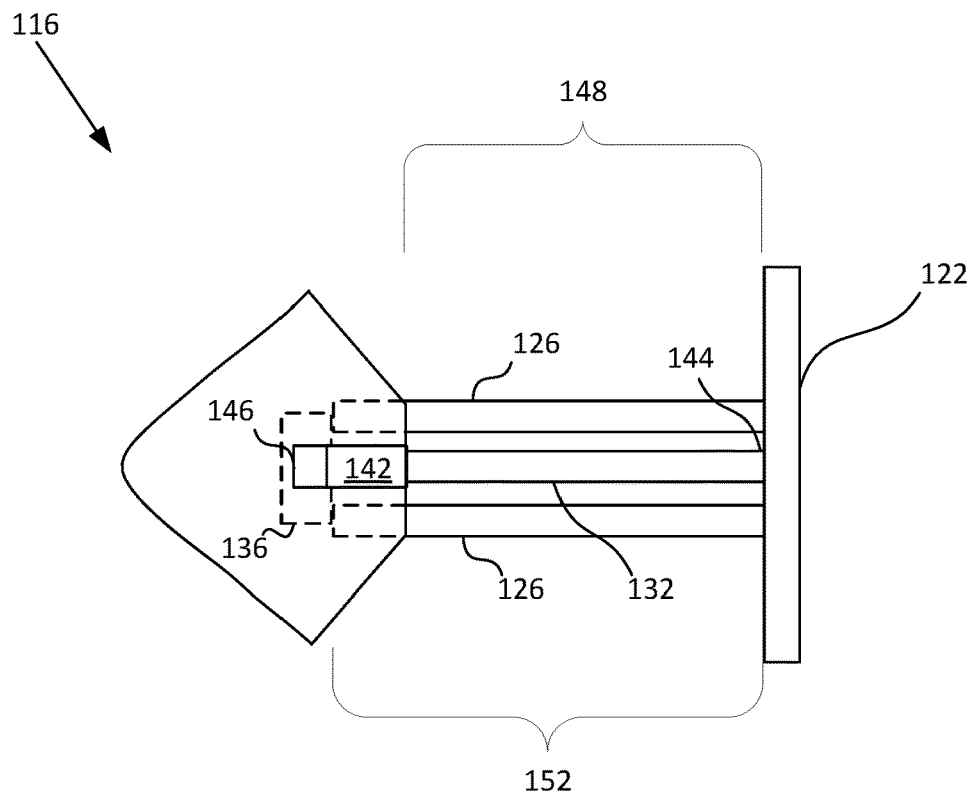
FIGS. 4a and 4b are schematic diagrams of probe housing positions with respect to the attachment plate, according to examples of the subject disclosure.
Figure 4B:
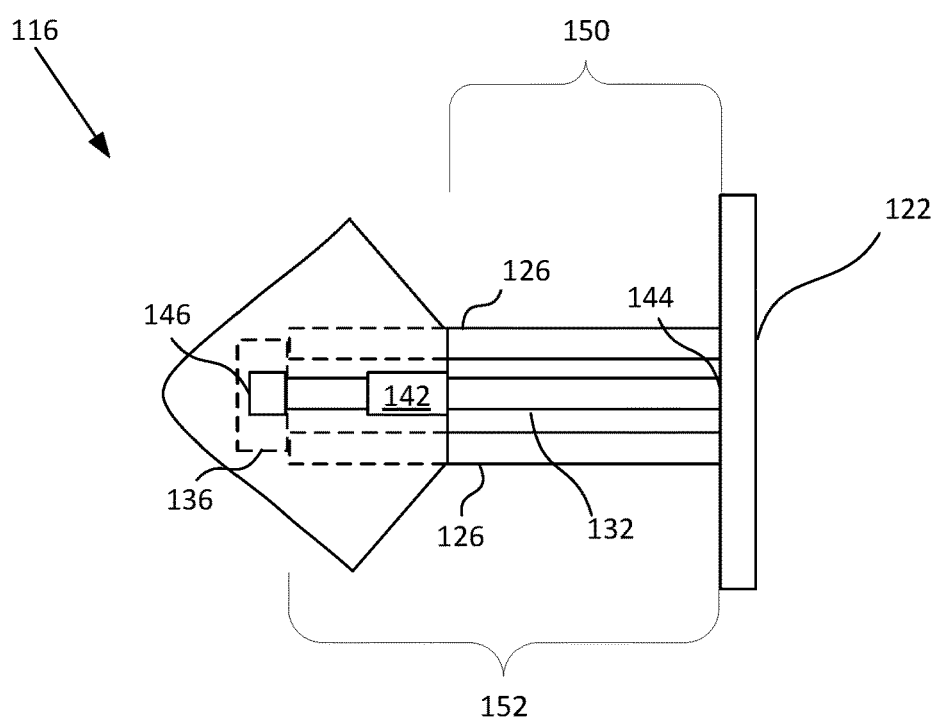

FIGS. 4a and 4b are schematic block diagrams of probe housing 116 positions with respect to the attachment plate 122, according to examples of the subject disclosure. In certain examples, the probe housing 116 includes one or more housing rod couplers 142. Each of the housing rod couplers 142 includes an opening (see FIGS. 7a-8b) that is configured to slidably engage the housing rod 132. The housing rod 132, in certain examples, is an elongated rod having a first end 144 fixedly coupled with the attachment plate 122, and a second end 146. The second end 146, as depicted, has a diameter greater than a diameter of the first end 144 or a region of the housing rod 132 between the first end 144 and the second end 146. As such, the second end 146 acts as a stop to prevent the probe housing 116 from translational movement along the housing rod 132, away from the attachment plate 122, past the second end 146.

FIG. 4a depicts a first position of the probe housing 116 at a maximum distance 148 away from the attachment plate 122. As discussed above, the biasing member 120 (omitted from FIGS. 4a and 4b for clarity) is disposed between the probe housing 116 and the attachment plate around the housing rod 132. The biasing member 120, in certain examples, is a compression spring, has a length that is greater than a maximum distance between the housing rod coupler 142 and the attachment plate 122. Accordingly, even at the maximum distance, the compression spring is applying a biasing force on the probe housing away from the attachment plate.

In the depicted example of FIG. 4a, the ultrasonic sensor array 136 is disposed within the probe housing 116 and is configured to move within a cavity of the probe housing 116. When the configuration of the manufacturing component 112 is such that the NDI apparatus 108 does not have sufficient clearance, the controller 110 instructs the robotic arm 102 to increase a distance between the TCP 104 and the manufacturing component 112. The robotic arm 102, in certain examples, positions the TCP 104 at a distance from the manufacturing component 112 such that the robotic arm "pushes" the probe housing 116 against the surface of the manufacturing component 112. This pushing force overcomes a spring force of the biasing member 120 and compresses the distance between the probe housing 116 and the attachment plate 122. FIG. 4b is a depiction of a minimum distance 150 between the probe housing 116 and the attachment plate. As the robotic arm 102 moves the TCP 104 towards and away from the manufacturing component 112 (to account for changes in the contour of the surface), the biasing member 120 pushes the probe housing 116 away from the attachment plate 122 and maintains contact between the probe housing 116 and the manufacturing component 112. The relative distance 152 between the ultrasonic sensor array 136, in certain examples, and the attachment plate 122 remains constant despite the movement of the probe housing 116 between the maximum distance 148 and the minimum distance 150.

Figure 5:
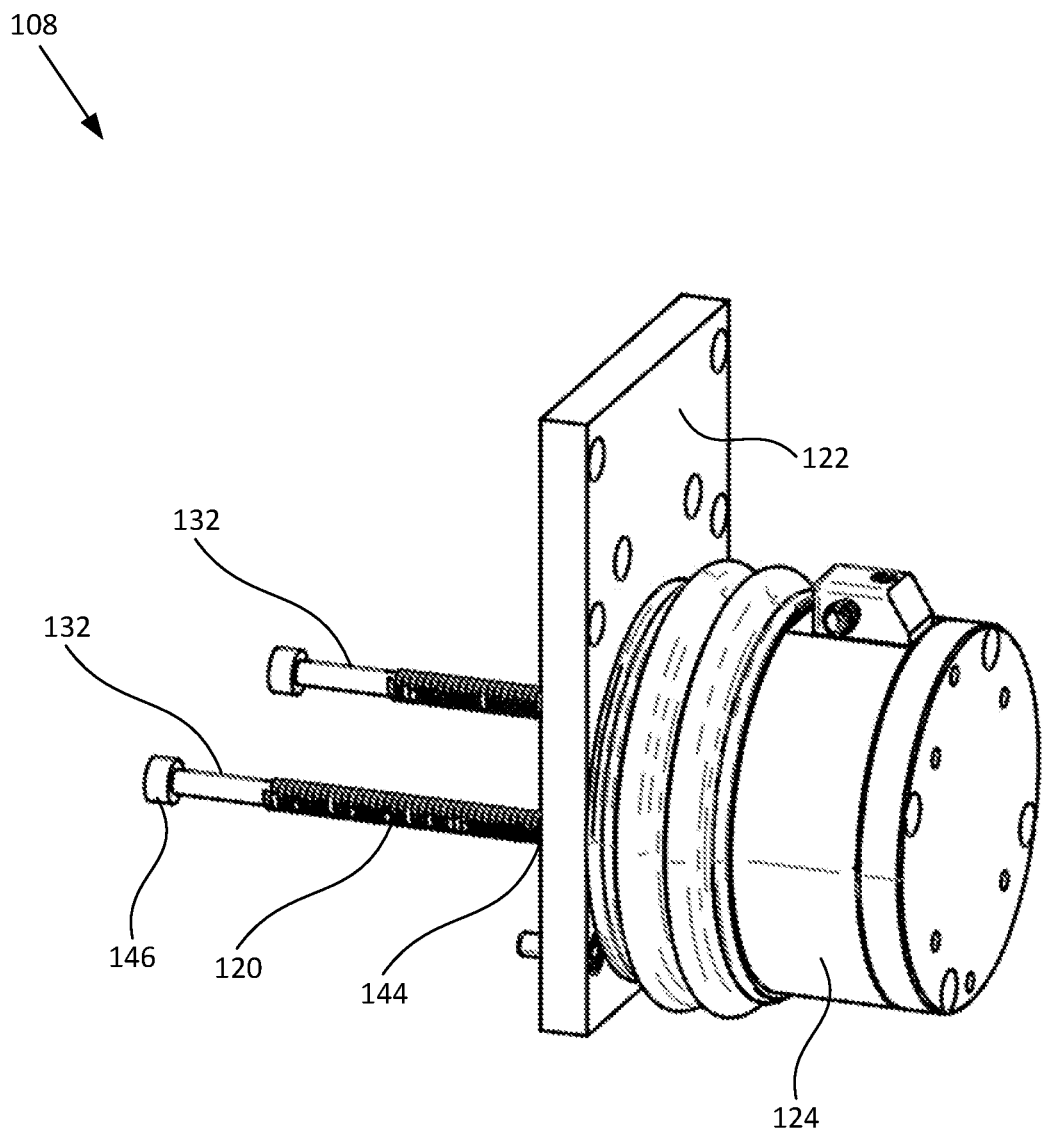
FIG. 5 is a perspective view diagram of the NDI apparatus, according to examples of the subject disclosure.

FIG. 5 is a perspective view diagram of the NDI apparatus 108, according to examples of the subject disclosure. FIG. 5 omits the probe housing 116 and the ultrasonic probe assembly 114. As discussed above, the housing rod 132 is a rigid member having first end 144 and second end 146. The second end 146, in certain examples, includes a head (or collar) that has a greater diameter than a diameter of the housing rod 132.

The housing rod 132 is configured to slideably engage the probe housing 116 and allow the probe housing 116 to move between a fully extended position (see FIG. 4a) to a collapsed position (see FIG. 4b). The biasing member 120, in certain examples, is a compression spring disposed around the housing rod 132. In certain examples, a single component is used to function as the housing rod 132 and the biasing member 120. For example, a gas spring, gas strut, or mechanical strut is capable of applying a biasing force to the probe housing 116 away from the attachment plate 122.

Figure 6:
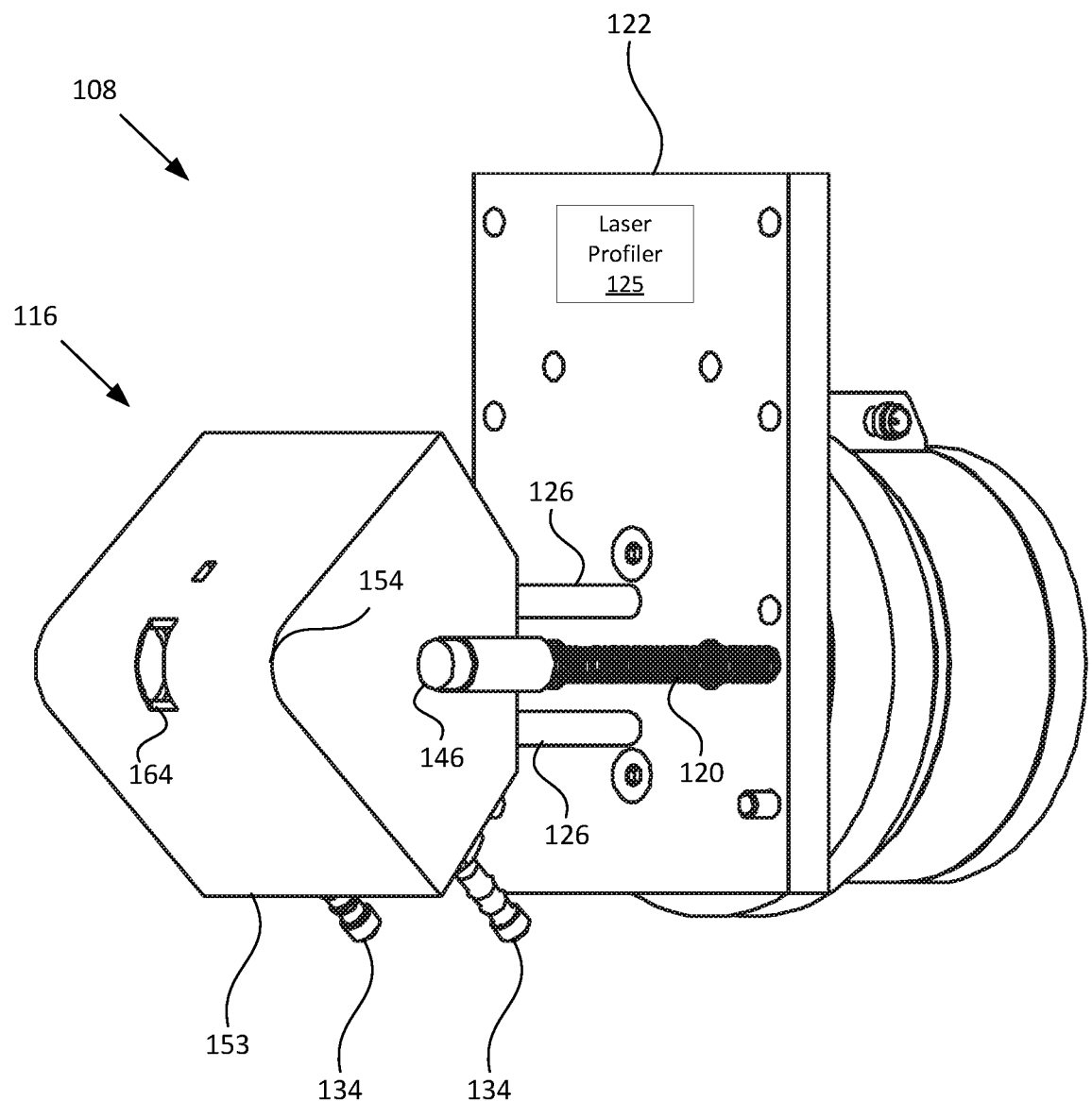
FIG. 6 is a perspective view diagram illustrating a part engagement surface of the probe housing, according to examples of the subject disclosure.

FIG. 6 is a perspective view diagram illustrating a part engagement surface 154 of the probe housing 116, according to examples of the subject disclosure. The probe housing 116, in certain examples, is formed of a body 153 that includes the part engagement surface 154 that is configured to contact the surface of the manufacturing component 112. The part engagement surface 154, in certain examples, is generally V-shaped to allow the probe housing 116 to traverse a wide variety of surface contours including, but not limited to, concave and convex surface contours.

The part engagement surface 154 also includes an opening 156 through which the ultrasonic sensor array 136 transmits and receives ultrasonic energy. Water, received by the hose couplings 134 and passed through internal passageways, exits through the opening 164. The part engagement surface 154, in certain examples, is substantially smooth and continuous to enable the probe housing 116 to traverse the surface of the manufacturing component 112 without damaging the manufacturing component 112.

Figure 7A:
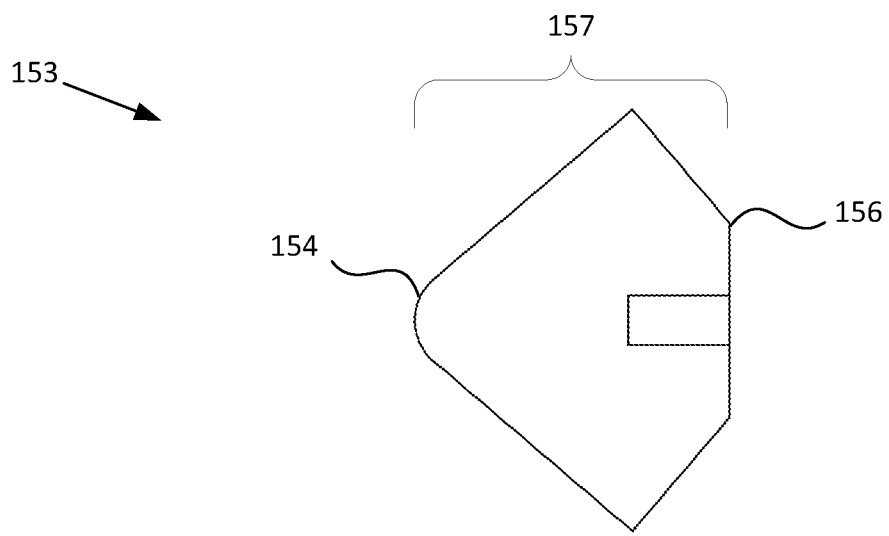
FIGS. 7a-7c are illustrations of the body, according to examples of the subject disclosure.
Figure 7B:
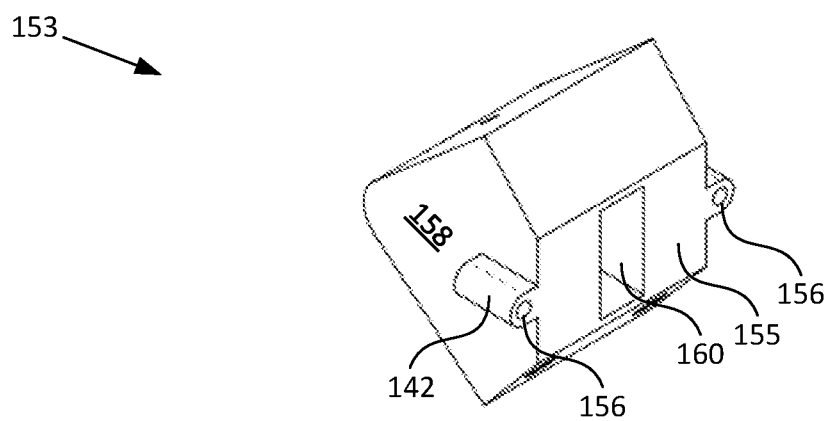
Figure 7C:
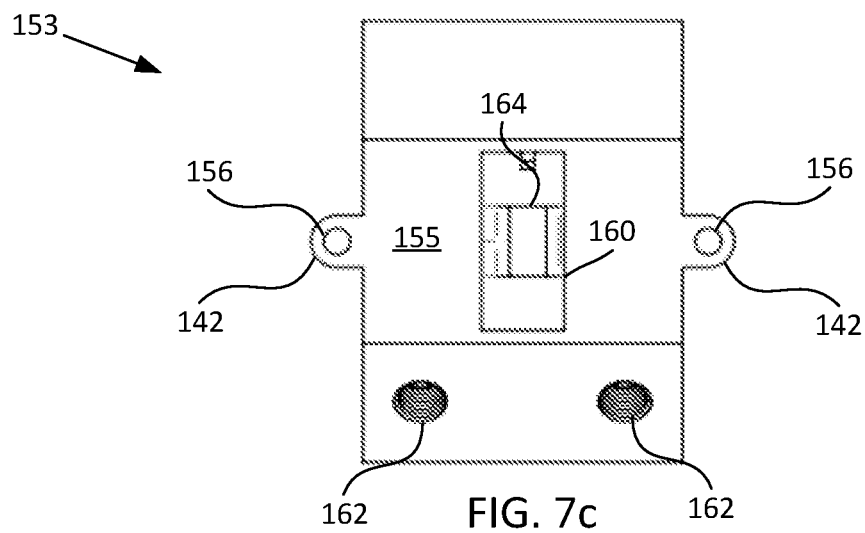

FIGS. 7a-7c are illustrations of the body 153, according to examples of the subject disclosure. In particular, FIG. 7a is a side view illustration of the body 153 that depicts the part engagement surface 154 and an opposing end surface 155. The end surface 155, in certain examples, faces the attachment plate 122 of the attachment body 118 while the part engagement surface 154 faces away from the attachment plate 122. The body 153, in certain examples, includes a pair of openings 156 formed in the body 153 for receiving the housing rods 132. In certain examples, the openings 156 are formed in housing rod couplers 142 that extend outward from a side surface 158 of the body 153. The diameter of the opening 156 is less than the second end 146 of the housing rod 132 so that the second end 146 of the housing rod 132 acts as a bump stop to movement of the body 153 away from the attachment plate 122. In certain examples, a distance 157 between the part engagement surface 154 and the end surface 155 is between about 1 and 5 inches.

In certain examples, a sensor cavity 160 is formed in the body 153. An opening in the end surface 155 is configured to receive the ultrasonic probe assembly 114 and allow movement of the body 153 with respect to the ultrasonic probe assembly 114. As the NDI apparatus 108 traverses the surface of the manufacturing component 112, and the probe housing 116 moves to different positions between the fully extended position and a collapsed position, the ultrasonic probe assembly 114 will move translationally within the sensor cavity 160. In certain embodiments, the sensor cavity 160 extends from an opening in the end surface 155 to an opening 164 in the part engagement surface 154.

Water channels, in certain examples, extend through the body 153 from the end surface 155 to the part engagement surface 154. Water openings 162, in certain examples, are threaded for connecting to the hose couplings 134. The water openings 162 are fluidly coupled with water channels that extend through the body 153 to direct water out the opening 164 of the part engagement surface 154.

Figure 8A:
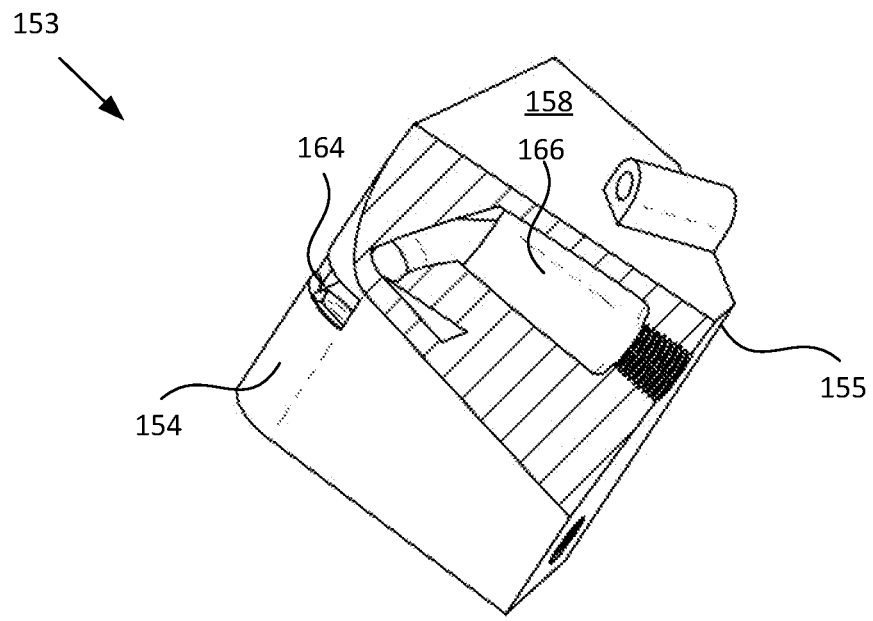
FIGS. 8a and 8b are section view diagrams of the body, according to examples of the subject disclosure.
Figure 8B:
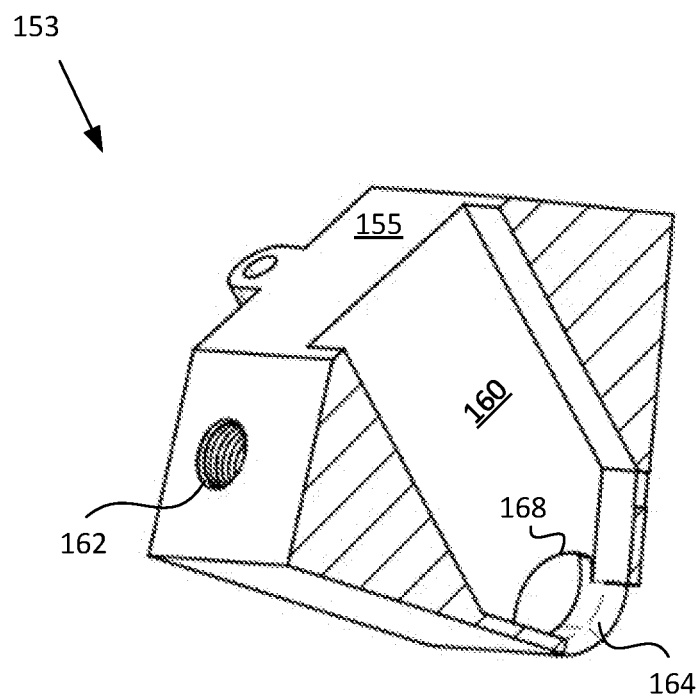

FIGS. 8a and 8b are section view diagrams of the body 153, according to examples of the subject disclosure. As discussed above, the body 153 is formed with at least one water channel 166 that extends through the body 153 from the end surface 155 to the part engagement surface 154. In certain examples, the water channel 166 extends to a second opening 168 in the sensor cavity 160 that is adjacent the opening 164 in the part engagement surface 154. Beneficially, this allows water to flow into the area between the ultrasonic sensor array 136 and the manufacturing component 112 and provide a coupling medium for the ultrasonic energy.

Figure 9:
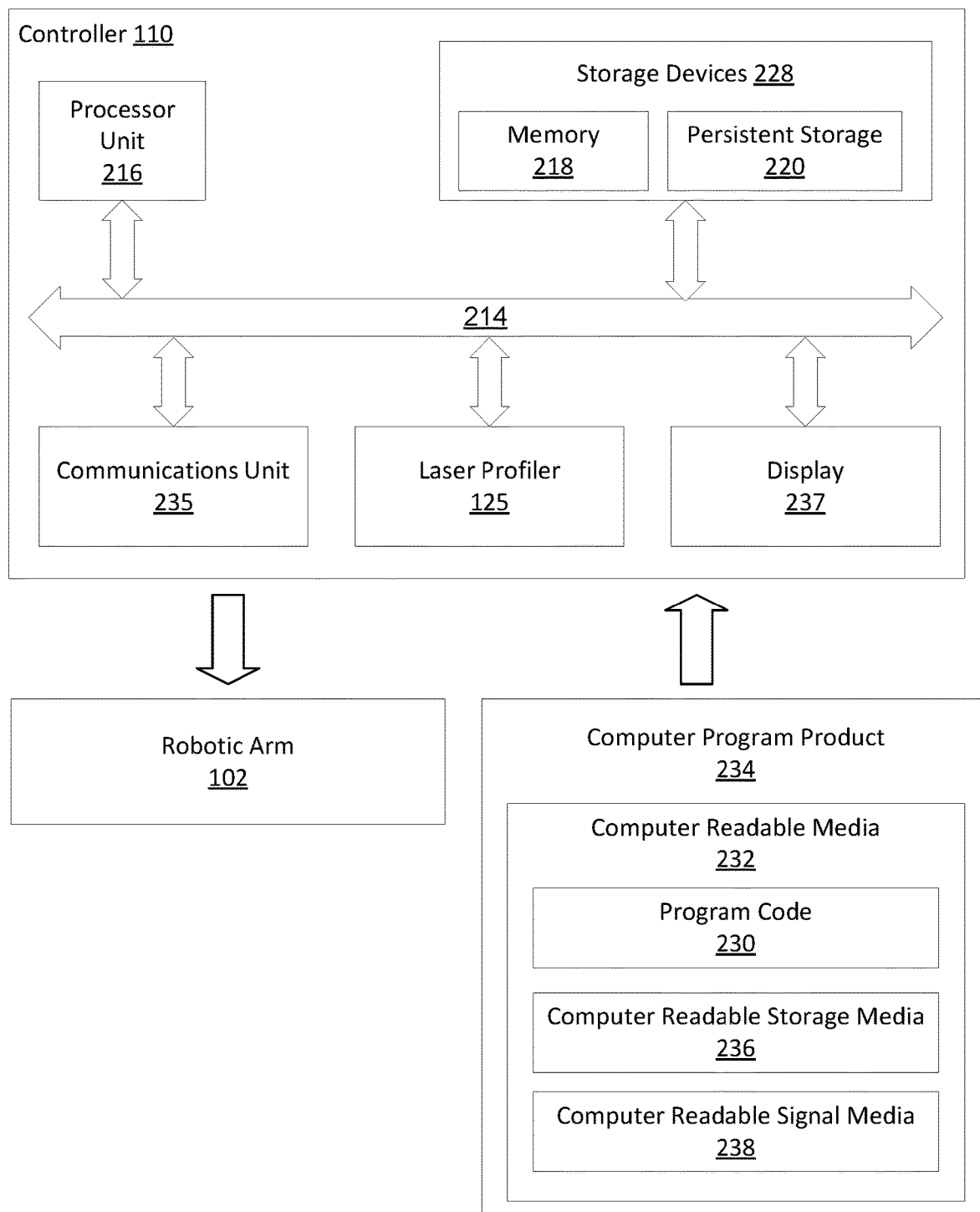
FIG. 9 is a schematic block diagram illustrating a controller, according to examples of the subject disclosure.

FIG. 9 is a schematic block diagram illustrating a controller 110, according to examples of the subject disclosure. The controller 110 is an example of a computing device, which, in some examples, is used to implement one or more components of examples of the disclosure, and in which computer usable program code or instructions implementing the processes can be located for the illustrative examples. In this illustrative example, the controller includes a communications fabric 214, which provides communications between a processor unit 216, memory 218, a laser profiler 125, persistent storage 220, a communications unit 235, and a display 237. The laser profiler 125, in certain examples, is disposed on the attachment plate 122 and is configured to scan the surface of the manufacturing component 112 to determine an inspection radius of the wing spar for example, and also to determine a minimum web to flange angle of the web 130 and flange 128. The laser profiler 125 is also configured to measure a distance between the TCP 104 and the manufacturing component 112 and communicate that distance with the controller 110. In turn, the controller 110 is configured to move the TCP 104 in response to the determined distance.

The processor unit 216 serves to execute instructions for software that are loaded into memory 218 in some examples. In one example, the processor unit 216 is a set of one or more processors or can be a multi-processor core, depending on the particular implementation. Further, the processor unit 216 is implemented using one or more heterogeneous processor systems, in which a main processor is present with secondary processors on a single chip, according to some examples. As another illustrative example, the processor unit 216 is a symmetric multi-processor system containing multiple processors of the same type.

Memory 218 and persistent storage 220 are examples of storage devices 228. A storage device is any piece of hardware that is capable of storing information, such as, for example, without limitation, data, program code in functional form, and/or other suitable information either on a temporary basis and/or a permanent basis. Memory 218, in these examples, is a random-access memory, or any other suitable volatile or non-volatile storage device. Persistent storage 220 takes various forms, depending on the particular implementation. In one example, persistent storage 220 contains one or more components or devices. In an example, persistent storage 220 is a hard drive, a flash memory, a rewritable optical disk, a rewritable magnetic tape, or some combination of the above. The media used by persistent storage 220 is removable in some examples. For example, a removable hard drive is used for persistent storage 220 in various implementations.

The communications unit 235, in these examples, provides for communication with other data processing systems or devices. In these examples, the communications unit 235 is a network interface card. The communications unit 235 provides communications through the use of either, or both, physical and wireless communications links. In some examples, the communication unit 235 also provides a connection for user input through a keyboard, a mouse, and/or some other suitable input device. Further, the input/output unit sends output to a printer or receive input from any other peripheral device in various examples. The display 237 provides a mechanism to display information to a user.

In some examples, instructions for the operating system, applications, and/or programs are located in the storage devices 228, which are in communication with the processor unit 216 through the communications fabric 214. In these illustrative examples, the instructions are in a functional form on persistent storage 220. These instructions are loaded into memory 218 for execution by the processor unit 216 in some examples. In certain examples, the processes of the different examples are performed by the processor unit 216 using computer implemented instructions, which is located in a memory, such as the memory 218.

These instructions are referred to as program code, computer usable program code, or computer readable program code that can be read and executed by a processor in the processor unit 216. The program code, in the different examples, is embodied on different physical or computer readable storage media, such as the memory 218 or the persistent storage 220.

Program code 230 is located in a functional form on computer readable media 232 that is selectively removable and can be loaded onto or transferred to the controller 110 for execution by the processor unit 216. In some examples, the program code also contains the scanning plan discussed above with reference to FIG. 1. The program code 230 and computer readable media 236 form computer program product 234. In one example, the computer readable media 232 is a computer readable storage media 236 or a computer readable signal media 238. The computer readable storage media 236 includes, in one example, an optical or magnetic disc that is inserted or placed into a drive or other device that is part of the persistent storage 220 for transfer onto a storage device, such as a hard drive, that is part of the persistent storage 220. In other examples, the computer readable storage media 236 also takes the form of a persistent storage, such as a hard drive, a thumb drive, or a flash memory that is connected to the controller 110. In some instances, the computer readable storage media 236 is not removable from the controller 110.

Alternatively, the program code 230 is transferred to the controller 110 using computer readable signal media 238. Computer readable signal media 238 is, as one example, a propagated data signal containing program code 230. For example, the computer readable signal media 238 is an electromagnetic signal, an optical signal, and/or any other suitable type of signal in one example. These signals are transmitted over communications links, such as wireless communication links, an optical fiber cable, a coaxial cable, a wire, and/or any other suitable type of communications link. In other words, the communications link and/or the connection is physical or wireless in the illustrative examples. The computer readable media also takes the form of non-tangible media, such as communications links or wireless transmissions containing the program code, in some examples.

In some illustrative examples, the program code 230 is downloaded over a network to the persistent storage 220 from another device or data processing system through the computer readable signal media 238 for use within the controller 110. In one instance, program code stored in a computer readable storage media in a server data processing system is downloaded over a network from a server to the controller 110. According to various examples, the system providing the program code 230 is a server computer, a client computer, or some other device capable of storing and transmitting program code 230.

The different components illustrated for the controller 110 are not meant to provide physical or architectural limitations to the manner in which different examples can be implemented. The different illustrative examples can be implemented in a controller including components in addition to and/or in place of those illustrated for the controller 110. Other components shown in FIG. 9 can be varied from the illustrative examples shown. The different examples can be implemented using any hardware device or system capable of executing program code. For example, a storage device in the controller 110 is any hardware apparatus that can store data. The memory 218, persistent storage 220, and the computer readable media 232 are examples of storage devices in a tangible form.

In another example, a bus system is used to implement communications fabric 214 and can be comprised of one or more buses, such as a system bus or an input/output bus. Of course, in some examples, the bus system is implemented using any suitable type of architecture that provides for a transfer of data between different components or devices attached to the bus system. In addition examples, a communications unit includes one or more devices used to transmit and receive data, such as a modem or a network adapter. Further, a memory is, for example, the memory 218 or a cache such as found in an interface and memory controller hub that can be present in the communications fabric 214.

Computer program code for carrying out operations for aspects of the subject disclosure can be written in any combination of one or more programming languages, including an object-oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
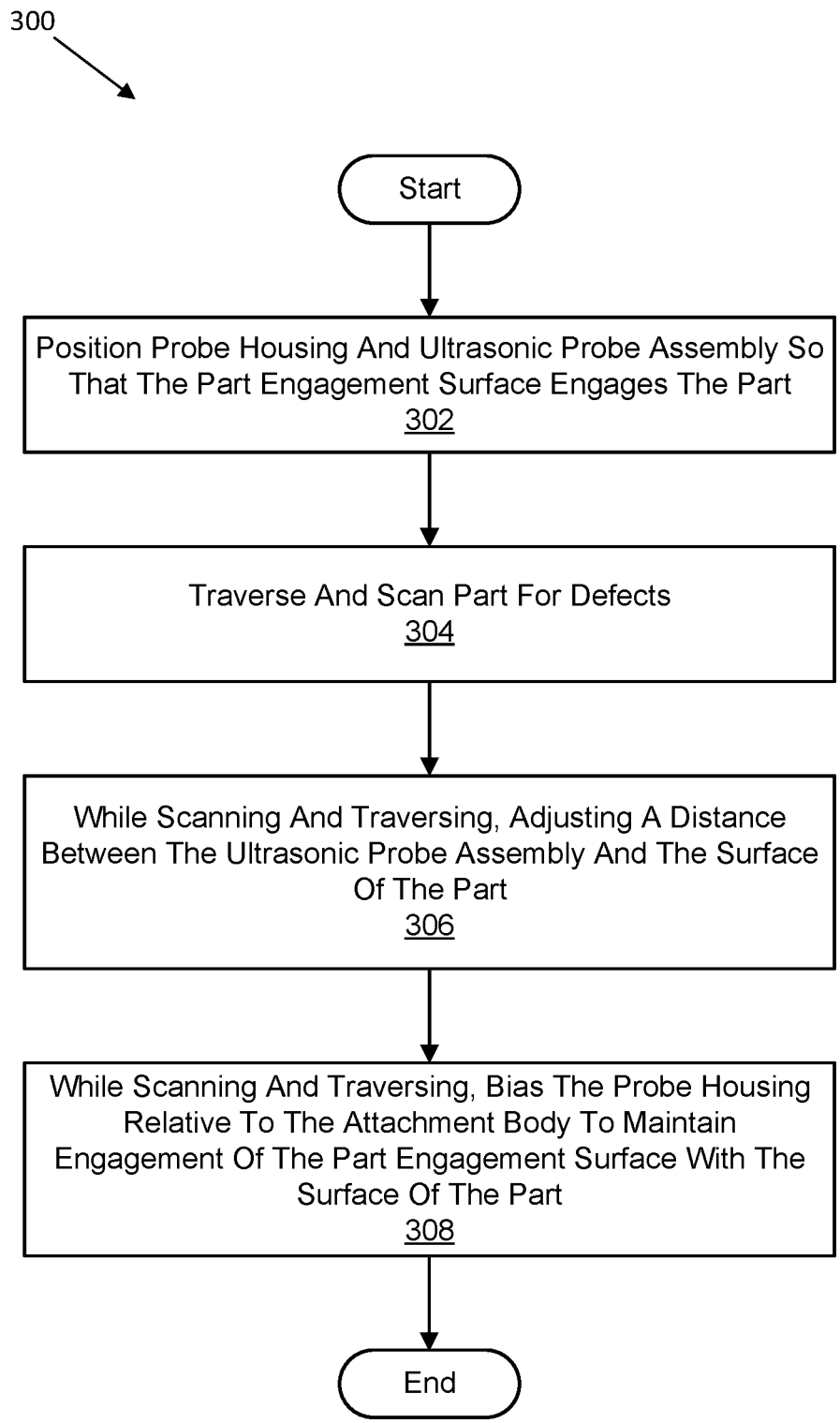
FIG. 10 is a flowchart diagram illustrating a method of non-destructively inspecting a part, according to examples of the subject disclosure.

FIG. 10 is a flowchart diagram illustrating a method 300 of non-destructively inspecting a part, according to examples of the subject disclosure. The method includes, at step 302, positioning the probe housing 116 and ultrasonic probe assembly 114 so that the part engagement surface 154 engages the part (e.g., the manufacturing component 112). Engaging the surface of the part 112 may include pressing the part engagement surface 154 against the surface of the part 112. In certain examples, the method 300 includes, at step 304, ultrasonically scanning the part for defects while traversing the part engagement surface across a surface of the part. The method also includes, at step 306, adjusting a distance between the ultrasonic probe assembly and the surface of the part while traversing and scanning the part. The method also includes, at step 308, biasing the probe housing 116 relative to the attachment body 118 to maintain engagement of the part engagement surface 154 with the surface of the part.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A non-destructive inspection (NDI) apparatus comprising:
    an attachment body configured to attach to a robotic arm, where the robotic arm defines a tool center point (TCP);
    an ultrasonic probe assembly fixedly coupled to the attachment body such that the ultrasonic probe assembly is non-moveably fixed relative to the TCP of the robotic arm and movement of the TCP by the robotic arm results in a corresponding movement of the ultrasonic probe assembly;
    a probe housing disposed around the ultrasonic probe assembly and moveably coupled to the attachment body such that the ultrasonic probe housing is moveable relative to the ultrasonic probe assembly; and
    a biasing member disposed between the attachment body and the probe housing, where the biasing member urges the probe housing away from the attachment body.

2. The NDI apparatus of claim 1, further comprising a first housing rod slidably coupled with an opening in the probe housing, wherein the biasing member is disposed between the opening of the probe housing and the attachment body and the first housing rod comprises:
    a first end coupled to the attachment body; and
    a second end having a diameter greater than a diameter of the opening of the probe housing.

3. The NDI apparatus of claim 2, where the biasing member comprises a compression spring positioned around the first housing rod.

4. The NDI apparatus of claim 3, further comprising a second housing rod slidably coupled with a second opening in the probe housing, wherein a second biasing member is disposed between the second opening of the probe housing and the attachment body and the second housing rod comprises:
    a first end coupled to the attachment body; and
    a second end having a diameter greater than a diameter of the second opening of the probe housing.

5. The NDI apparatus of claim 4 where the second biasing member comprises a second compression spring positioned around the second housing rod.

6. The NDI apparatus of claim 1, where the attachment body comprises:
    an attachment plate; and
    an overload protection device disposed between the attachment plate and the robotic arm.

7. The NDI apparatus of claim 1, where the probe housing comprises:
    a body having:
        a part engagement surface configured to engage a surface of a part and facing away from the attachment body;
        an end surface facing the attachment body; and
        a sensor cavity formed in the body and configured to receive the ultrasonic probe assembly and to allow the ultrasonic probe assembly to translationally move within the sensor cavity, where the sensor cavity extends entirely through the body from the end surface to the part engagement surface.

8. The NDI apparatus of claim 7, wherein an entire length of the sensor cavity, between the part engagement surface and the end surface is between about 1 inch and about 5 inches.

9. The NDI apparatus of claim 7, further comprising a water channel formed in the body and extending from a first opening in the end surface of the body to a second opening formed in a wall of the sensor cavity, the second opening positioned adjacent an opening in the part engagement surface of the body.

10. The NDI apparatus of claim 7, where the part comprises a wing spar having a varying radius and a varying web to flange angle, and where a size and a shape of the probe housing is selected according to a maximum radius of the wing spar and a minimum web to flange angle of the wing spar.

11. The NDI apparatus of claim 1, where the ultrasonic probe assembly comprises:
    an ultrasonic sensor array; and
    at least one sensor rod having a first end rigidly coupled to the attachment body and a second end rigidly coupled to the ultrasonic sensor array, the at least one sensor rod configured to maintain a fixed position of the ultrasonic sensor array with reference to the attachment body.

12. A system for non-destructively inspecting a part, the system comprising:
    a robotic arm;
    a controller configured to control movement of a tool center point (TCP) of the robotic arm; and
    a non-destructive inspection (NDI) apparatus coupled to the TCP, the NDI apparatus comprising:
        an attachment body configured to attach to a robotic arm, where the robotic arm defines the TCP;
        an ultrasonic probe assembly fixedly coupled to the attachment body such that the ultrasonic probe assembly is non-moveably fixed relative to the TCP of the robotic arm and movement of the TCP by the robotic arm results in a corresponding movement of the ultrasonic probe assembly;
        a probe housing disposed around the ultrasonic probe assembly and moveably coupled to the attachment body such that the ultrasonic probe housing is moveable relative to the ultrasonic probe assembly; and
        a biasing member disposed between the attachment body and the probe housing, where the biasing member urges the probe housing away from the attachment body.

13. The system of claim 12, further comprising a first housing rod slidably coupled with an opening in the probe housing, wherein the biasing member is disposed between the opening of the probe housing and the attachment body and the first housing rod comprises:
    a first end coupled to the attachment body; and
    a second end having a diameter greater than a diameter of the opening of the probe housing.

14. The system of claim 13, where the biasing member comprises a compression spring positioned around the first housing rod.

15. The system of claim 12, where the ultrasonic probe assembly comprises:
- an ultrasonic sensor array; and
- at least one sensor rod having a first end rigidly coupled to the attachment body and a second end rigidly coupled to the ultrasonic sensor array, the at least one sensor rod configured to maintain a fixed position of the ultrasonic sensor array with reference to the attachment body.

16. The system of claim 12, where the probe housing comprises:
- a body having:
  - a part engagement surface configured to engage a surface of a part and facing away from the attachment body;
  - an end surface facing the attachment body; and
  - a sensor cavity formed in the body and configured to receive the ultrasonic probe assembly and to allow the ultrasonic probe assembly to translationally move within the sensor cavity, where the sensor cavity extends entirely through the body from the end surface to the part engagement surface.

17. The system of claim 16, further comprising a water channel formed in the body and extending from a first opening in the end surface of the body to a second opening formed in a wall of the sensor cavity, the second opening positioned adjacent an opening in the part engagement surface of the body.

18. The system of claim 12, where the controller comprises a laser profiler configured to measure a distance between the TCP and an inspection radius, and where the controller is further configured to move the TCP in response to the measured distance.

19. A method of non-destructively inspecting a part, the method comprising:
- positioning a probe housing and an ultrasonic probe assembly such that a moveable part engagement surface of the probe housing engages the part, wherein the ultrasonic probe assembly is fixedly coupled to an attachment body and the probe housing is moveably coupled to the attachment body;
- ultrasonically scanning the part for defects while traversing the part engagement surface across a surface of the part;
- moving the biasing probe relative to the probe housing;
- adjusting a distance between the ultrasonic probe assembly and the surface of the part while traversing and scanning the part; and
- biasing the probe housing relative to the attachment body to maintain engagement of the part engagement surface with the surface of the part.

20. The method of claim 19, where engaging the surface of the part comprises pressing the part engagement surface against the surface of the part.

* * * * *